Feb. 7, 1956     H. C. HARDY     2,733,597
APPARATUS FOR MEASURING VIBRATIONS
Filed July 12, 1952
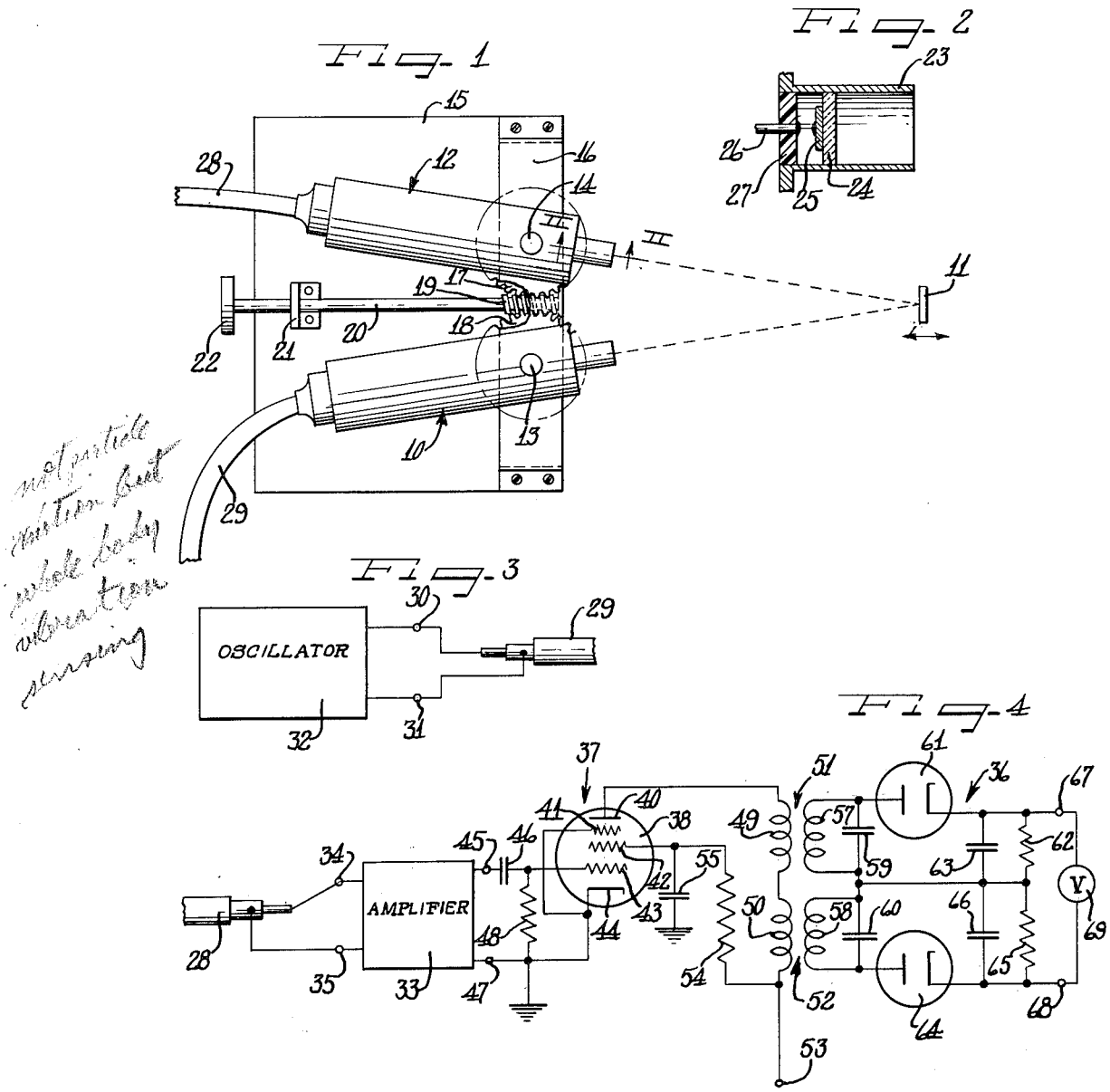
Inventor
Howard C. Hardy

United States Patent Office 2,733,597
Patented Feb. 7, 1956

2,733,597
APPARATUS FOR MEASURING VIBRATIONS

Howard C. Hardy, Northlake, Ill., assignor to Armour Research Foundation of the Illinois Institute of Technology, Chicago, Ill., a corporation of Illinois Application July 12, 1952, Serial No. 298,649

2 Claims. (Cl. 73—69)

This invention relates to apparatus for measuring vibrations and more particularly to apparatus for measuring amplitude, velocity and frequency of vibration of a body without imposing any mechanical load thereon.

According to this invention, a sound wave of substantially fixed frequency is transmitted toward a moving or vibrating surface which may be flat, concave, convex or irregular but sufficient to reflect the sound wave to some extent. The sound wave reflected from the surface is received and converted into electrical energy. Due to what is known as the "Doppler" effect, the frequency of the reflected sound wave will deviate from the fixed frequency of the transmitted wave in direct proportion to the velocity of the movable or vibrating surface. The reflected sound wave, accordingly, is a wave frequency modulated in accordance with the velocity of the surface. By this invention, a discriminator is responsive to the electrical energy converted from the reflected sound wave and produces an output voltage proportional to the change in frequency of the reflected sound wave relative to the fixed frequency of the transmitted sound wave and hence proportional to the velocity of the moving or vibrating surface.

The output of the discriminator may be connected to an A.-C. volt meter which will have a reading proportional to the amplitude of vibration, and maximum velocity of the vibrating surface. The output of the discriminator may also be connected to an oscilloscope or oscillograph to give a visual indication of the manner of vibration or movement of the surface and might also be connected to a frequency analyzer to determine the frequency of vibration. Recording apparatus might also, of course, be responsive to the output of the discriminator.

It will be immediately apparent that this invention has the highly important advantage of giving an accurate measurement for indication of the vibration or movement of a surface without imposing any mechanical load on the surface. In addition, this invention permits remote measurement of the vibration or movement. In this connection it may be noted that the transmitted sound wave may be directed to only a small portion of a movable or vibrating surface so as to measure the vibration of that portion independent of other portions of the surface. Moreover, this invention gives extremely accurate measurements with a minimum of required components and a minimum of trouble that might be experienced from mal-functioning of components. Highly important also is the fact that the components can be assembled into a small, compact and portable unit.

Another object of this invention is to provide improved apparatus for accurately measuring vibration and movement of a surface remotely and without mechanical load on the surface.

This invention contemplates other objects, features and advantages which will become more fully apparent from the following detailed description taken in conjunction with the accompanying drawings which illustrate a preferred embodiment and in which:

Figure 1 is a plan view of a sound transmitting and receiving assembly disposed to measure vibration of a movable surface, according to the principles of this invention;

Figure 2 is a sectional view, on an enlarged scale, taken substantially along lines II—II of Figure 1 and illustrating one of the electro-acoustical transducer units used in the assembly of Figure 1;

Figure 3 is a diagrammatical illustration of the energization of the sound transmitting unit; and Figure 4 is a schematic diagram of the receiving and discriminating unit.

As shown on the drawings:

In Figure 1, reference numeral 10 designates an electro-acoustical transducer unit arranged to transmit sound toward a movable or vibrating member 11 while reference numeral 12 designates an electro-acoustical transducer unit arranged to receive sound waves reflected from the member 11. The transmitting transducer 10 and the receiving transducer 12 are fixed on shafts 13 and 14, respectively, which are journaled on a base 15 by a bracket 16 affixed to the base 15. Also affixed to shafts 13 and 14 are gears 17 and 18, respectively, which are disposed intermediate the bracket 16 and the base 15. A pinion 19 meshes with both gears 17 and 18 and is carried by a shaft 20 journaled for rotation in a bracket 21 secured to the base 15. The shaft 20 carries a knob 22 which may be manually rotated to simultaneously turn the transmitting transducer 10 and the receiving transducer 12 through the gears 17 and 18, respectively, meshed with the pinion 19. It will be noted that the receiving transducer 12 and the transmitting transducer 10 are rotated in opposite directions and may be aimed at any target in line with the shaft 20 and at a distance from the transducers determined by the extent of rotation thereof.

The construction of both the transmitting transducer 10 and the receiving transducer 12 is similar, Figure 2 being a sectional view through the receiving transducer 12 and illustrating the construction thereof which includes a tubular housing 23, a piezo-electric crystal 24 disposed in the housing 23, a conductive plate 25 secured to the back of the crystal 24, and a connector pin 26 connected to the plate 25 and carried by an insulator 27. With this structure, a voltage will be induced between the housing 23 and the connector pin 26 proportional to the mechanical movement of the crystal 24 induced by sound waves reflected from the vibrating member 11. Conversely, in the transmitting transducer 10, the crystal thereof will be moved in proportion to the energizing voltage applied thereto.

The connector pin 26 and the housing of the receiving transducer 12 are connected to a shielded cable 28, a loading coil (not shown) preferably being connected in series between the connector pin 26 and the cable 28. Likewise, the crystal and housing of the transmitting transducer unit 10 are connected to a cable 29.

As shown in Figure 3, the terminal end of the cable 29 for the transmitting transducer 10 is connected to terminals 30 and 31 of a substantially fixed frequency oscillator 32. With the fixed frequency sound waves from the transmitting transducer 10 striking the movable or vibrating member 11, the reflected sound waves striking the receiving transducer 12 will have a frequency differing from the fixed frequency of the transmitted sound waves in proportion to the velocity of movement of the member 11. The electrical energy output of the receiving transducer 12, therefore, will have a frequency differing from the fixed frequency in proportion to the velocity of the member 11, and may be considered a frequency modulated signal. This signal in the cable 28 is fed to an amplifier 33, Figure 4, the terminal end of the cable 28 being connected to input terminals 34 and 35 of the amplifier 33.

The output of the amplifier 33 is fed to a discriminator circuit generally designated by reference numeral 36 which will be described in detail hereinafter and which is sensitive to deviation of frequency of the incoming signal from a fixed frequency. To prevent variations in the amplitude of the signal from the receiving transducer 12, and other variations in amplitude which might arise from the amplifier 33, from affecting the operation of the discriminator 36, a limiter 37 is herein provided between the amplifier 33 and the discriminator 36 to limit the amplitude of the signal applied to the discriminator 36.

The limiter 37 may be constructed in any desired manner but herein includes a high-vacuum pentode tube 38 having a plate 40, a suppressor grid 41, a screen grid 42, a control grid 43, a cathode 44 and a heater (not shown) for heating the cathode 44 to a temperature in which it will emit electrons in a well-known manner. One output terminal 45 of the amplifier 33 is connected through a capacitor 46 to the control grid 43 while another output terminal 47 of the amplifier 33 is connected to ground. The control grid 43 is connected through a grid-leak resistor 48 to ground and the cathode 44 and the suppressor grid 41 are likewise connected to ground. The plate 40 is connected through series connected primaries 49 and 50 of output transformers 51 and 52, respectively, to a terminal 53 which may be connected to a source of high positive potential with respect to ground. The screen grid 42 is connected through a resistor 54 to the terminal 53 while a capacitor 55 between the screen grid 42 and ground is provided to minimize high frequency variations in voltage at the screen grid 42. The potentials of the limiter tube 38 are such that the A.-C. output current flowing in the transformer primaries 49 and 50 is limited to a predetermined value so that variations in the amplitude of the signal at terminals 45 and 47 will not affect changes in amplitude applied to the discriminator 36.

The discriminator 36 includes secondaries 57 and 58 of the transformers 51 and 52, respectively, which are tuned by capacitors 59 and 60 to different frequencies, one a given amount above the fixed frequency of the oscillator 32 and the other preferably the same amount below the fixed frequency of the oscillator 32. The secondary 57 is connected to a circuit including a diode 61 and a resistor 62, a capacitor 63 being connected across the resistor 62 to minimize high frequency variations in voltage across the resistor 62. The secondary 58 is connected in a similar fashion to a circuit including a diode tube 64, a resistor 65 and a capacitor 66 across the resistor 65. The high frequency voltages of the secondaries 57 and 58 are thus rectified by the diodes 61 and 64 and are combined across the resistors 62 and 65, the output of the discriminator appearing between the terminals 67 and 68.

Within the limits of operation of the discriminator, the voltage between terminals 67 and 68 will be directly proportional to the difference in frequency between the fixed frequency sound waves transmitted toward the member 11 and the frequency of the sound waves reflected from the member 11 and the polarity of the voltage will be determined by whether the frequency of the sound waves reflected from the member 11 is greater than or less than the frequency of the sound waves transmitted toward the member 11. Since the frequency of the sound waves reflected from the member 11 differs from the fixed frequency of the sound waves transmitted toward the member 11 in proportion to the velocity of movement of the member 11, the voltage appearing between the output terminals 67 and 68 of the discriminator 36 will indicate both the velocity and direction of movement of the member 11.

If the member 11 is oscillating toward and away from the transducers 10 and 12, an A.-C. voltage will be developed between the terminals 67 and 68 which will have an amplitude directly proportional to the velocity amplitude of vibration of the member 11. Further, assuming the vibratory movement of the member 11 is sinusoidal, as will ordinarily be true, the A.-C. voltage appearing between the terminals 67 and 68 will be directly proportional to the maximum velocity of the member 11 in its vibratory movement. Hence the A.-C. voltmeter 69 connected between the terminals 67 and 68, in Figure 4 will indicate both the amplitude of vibration of the member 11 and the maximum velocity thereof. If desired, such an A.-C. voltmeter may be calibrated so as to read such quantities directly.

If desired, an oscilloscope or oscillograph may be connected to the terminals 67 and 68 to give a visual picture of the movement of the member 11. Also, a frequency analyzer might be connected between the terminals 67 and 68 to determine the frequence of vibration of the member 11.

It will be apparent that the means of this invention are highly advantageous since they permit the amplitude, velocity and frequency of vibration of a surface to be measured accurately without imposing any load on the surface. Further, the required components are at a minimum and may be assembled in compact, portable form. Also, the construction and operation is sufficiently simple and straightforward that the possibility of mal-functioning is minimized.

It will be understood that modifications and variations may be effected without departing from this invention. For example, the electro-acoustical transducer units 10 and 12 utilize crystals but it is apparent that other types of electro-acoustical transducers might be used. The crystals are preferable, however, in the frequency range which is most satisfactory to the optimum operation of the invention. A fixed frequency from 100 to 500 kilocycles has been found to be highly satisfactory and the crystal type of electro-acoustical transducer operates very effectively over such a frequency range.

Other modifications, such as the use of different types of discriminators or limiters may be made, of course, without departing from the spirit and scope of the novel concepts of the present invention.

I claim as my invention:

1. Apparatus for measuring vibrations of a surface, comprising: acoustical energy transmitting and receiving means for transmitting acoustical energy toward a vibrating surface and receiving energy reflected therefrom with the frequency of the reflected energy deviating in both directions from the frequency of the transmitted energy in response to vibratory movement of the surface toward and away from said transmitting and receiving means, discriminator means coupled to said receiving means for responding to the varying frequency of the reflected energy and producing an alternating current electrical signal of amplitude and frequency corresponding to the amplitude and frequency of vibration of the vibrating surface, and means for coupling said alternating current electrical signal to alternating current indicating means.

2. Apparatus for measuring vibrations of a surface, comprising: a support base, a pair of directional electro-acoustical transducers mounted on said base, means for adjusting the positions of said transducers to aim the same at and transmit and receive acoustical energy toward and from a vibrating surface with the frequency of the received energy deviating in both directions from the frequency of the transmitted energy in response to vibratory movement of the surface toward and away from said transducers, a fixed frequency alternating current generator connected to one of said transducers, an amplifier having an output and having an input connected to the other of said transducers, a limiter having an output and having an input connected to said amplifier output, a discriminator connected to said limiter output for responding to the varying frequency of the received energy and producing an alternating current electrical signal of amplitude and frequency corresponding to the amplitude and frequency of vibration of the vibrating surface, and means for coupling said alternating current electrical signal to alternating current indicating means.

References Cited in the file of this patent

UNITED STATES PATENTS

| | | |
|---|---|---|
| 2,193,361 | Rice | Mar. 12, 1940 |
| 2,268,587 | Guanella | Jan. 6, 1942 |
| 2,399,017 | Goldman | Apr. 23, 1946 |
| 2,431,854 | Wood | Dec. 2, 1947 |
| 2,557,979 | Labin | June 26, 1951 |
| 2,596,529 | Clarke | May 13, 1952 |